(12) United States Patent
Wood et al.

(10) Patent No.: US 7,413,231 B1
(45) Date of Patent: Aug. 19, 2008

(54) TRUCK CARGO BED MANAGEMENT SYSTEM

(75) Inventors: Kenneth L. Wood, Clinton Township, MI (US); Liam J. McGuirk, Rochester Hills, MI (US); Paul D. Lopez, Livonia, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/683,661

(22) Filed: Mar. 8, 2007

(51) Int. Cl.
*B62D 33/08* (2006.01)

(52) U.S. Cl. ............... 296/26.11; 296/26.08; 296/37.6; 296/57.1; 410/129

(58) Field of Classification Search .............. 296/26.11, 296/37.6; 410/129, 140; 220/532, 533
See application file for complete search history.

(56) References Cited

U.S. PATENT DOCUMENTS

| | | | |
|---|---|---|---|
| 4,917,429 A | 4/1990 | Giger |
| 5,044,682 A | 9/1991 | Wayne |
| 5,265,993 A | 11/1993 | Wayne |
| 5,456,511 A | 10/1995 | Webber |
| 5,520,314 A | 5/1996 | Tkachuk |
| 5,586,850 A | 12/1996 | Johnson |
| 5,775,759 A | 7/1998 | Cummins |
| 5,816,637 A | 10/1998 | Adams |
| 5,820,188 A | 10/1998 | Nash |
| 5,845,953 A | 12/1998 | Rusnock |
| 5,902,000 A | 5/1999 | Wold |
| 5,924,753 A | 7/1999 | DiBassie |
| 6,015,178 A | 1/2000 | Haack |
| 6,019,410 A | 2/2000 | Trostle |
| 6,120,076 A | 9/2000 | Adsit |
| 6,367,858 B1 | 4/2002 | Bradford |
| 6,378,926 B1 | 4/2002 | Renze |
| 6,626,624 B1 | 9/2003 | Kopperud |
| 6,629,807 B2 | 10/2003 | Bernardo |
| 6,676,182 B2 | 1/2004 | Fitts |
| 6,908,134 B1 | 6/2005 | Summers |
| 6,948,755 B1 | 9/2005 | Bauer |
| 6,971,828 B2 | 12/2005 | Bernardo |
| 6,986,541 B1 | 1/2006 | Haack |
| 6,994,389 B1 | 2/2006 | Graffy |
| 7,007,995 B1 | 3/2006 | Scarberry |
| 7,063,366 B2 | 6/2006 | Leitner |
| 2003/0082023 A1 | 5/2003 | Bernardo |
| 2005/0152761 A1 | 7/2005 | Silamianos |

*Primary Examiner*—Joseph D Pape
(74) *Attorney, Agent, or Firm*—Thomas A. Jurecko

(57) ABSTRACT

A cargo bed management system for dividing or extending a bed of a motor vehicle. The cargo bed management system includes a main panel having a length approximately equal to a width of the bed, and a pair of side panels hingedly connected to the main panel so that the side panels may rotate relative to the main panel from a stowed position where the side panels are directed toward the main panel to an extended position where the side panels extend outward from the main panel. At least one bumper is affixed to an end of each of the side panels that are hingedly connected to the main panel such that the bumper increases a length of the main panel when said the panels are in the stowed position. The bumpers compress to secure the main panel and the side panels to the bed.

20 Claims, 6 Drawing Sheets

US 7,413,231 B1

TRUCK CARGO BED MANAGEMENT SYSTEM

FIELD OF THE INVENTION

The present teachings relate to an apparatus for dividing or extending the bed of a motor vehicle.

BACKGROUND OF THE INVENTION

Motor vehicles such as pickup trucks include a bed for carrying cargo of widely ranging sizes and shapes. For smaller items of cargo, however, it is desirable to restrain such items from movement within the bed so that the articles do not move or slide around within the bed during use of the vehicle. Previous mechanisms for this purpose have met with varying degrees of success. However, what is needed is bed divider that can be positioned within the truck bed and move easily between a plurality of positions within the bed to fit cargo or articles of varying shapes and sizes. Even more particularly, what is needed is a divider that can be adjustably positioned at a number of positions within the truck bed, and that can also be quickly and easily moved out of the way to allow very large items to be easily loaded and carried within the truck bed without interference from the bed divider.

SUMMARY OF THE INVENTION

The present teachings provide a cargo bed management system for dividing or extending a bed of a motor vehicle. The cargo bed management system includes a main panel having a length approximately equal to a width of the bed, and a pair of side panels hingedly connected to the main panel so that the side panels may rotate relative to the main panel from a stowed position where the side panels are directed toward the main panel to an extended position where the side panels extend outward from the main panel. At least one bumper is affixed to an end of each of the side panels that are hingedly connected to the main panel such that the bumper increases a length of the main panel when said the panels are in the stowed position. The bumpers compress to secure the main panel and the side panels to the bed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present teachings will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
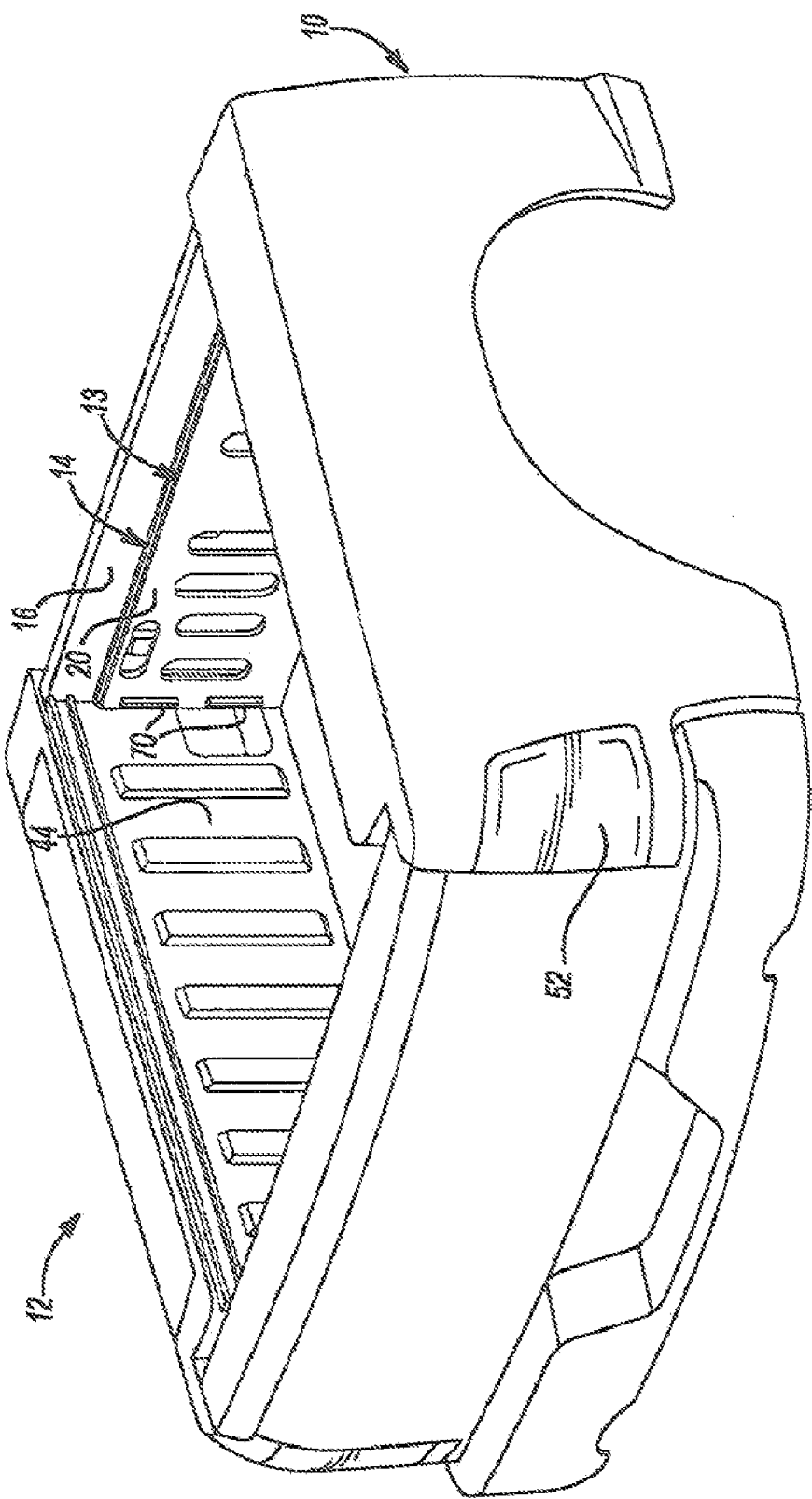
FIG. 1 is a perspective view of a cargo bed management system according to the present teachings in a stowed position.
Figure 2:
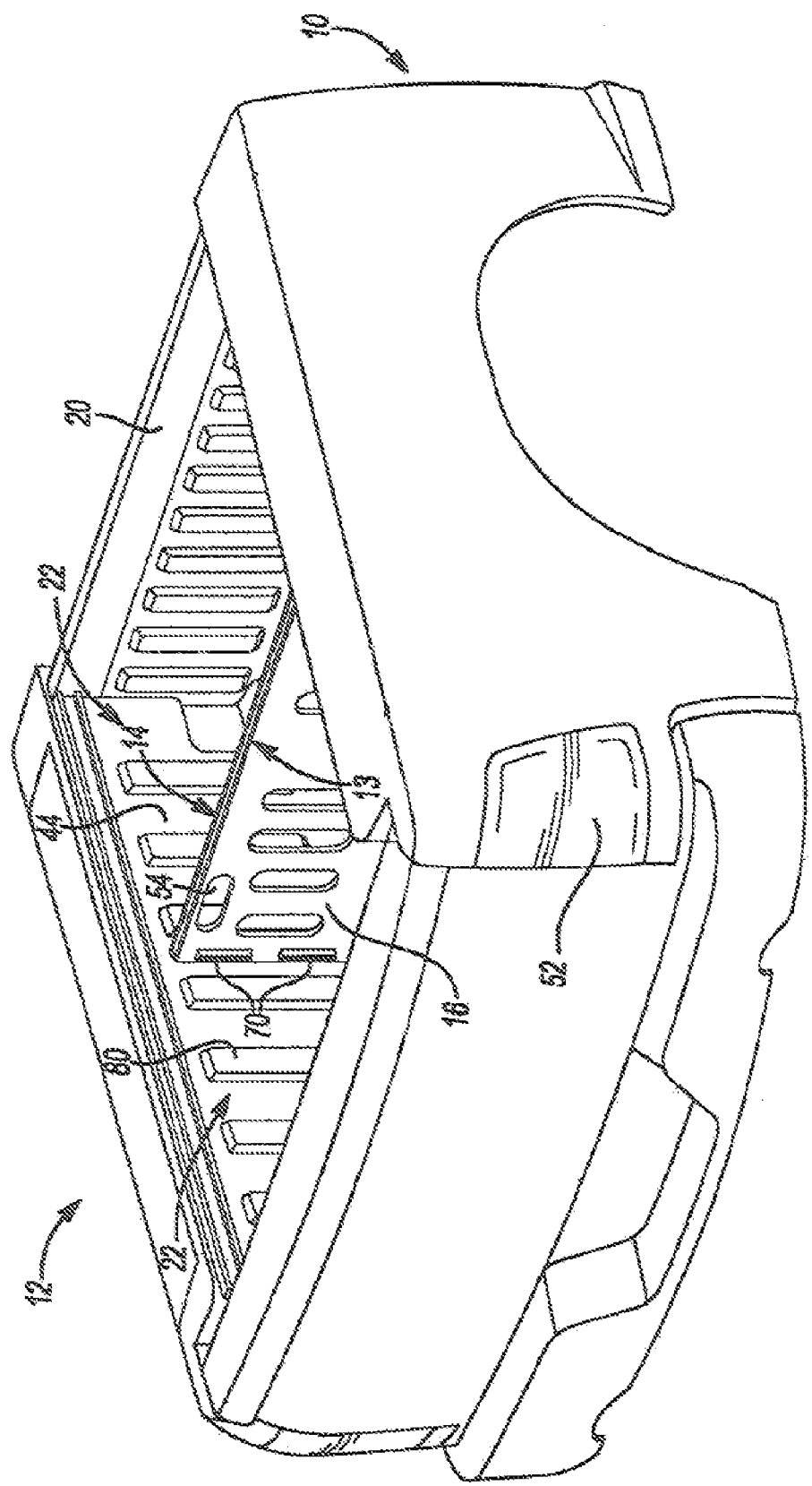
FIG. 2 is a perspective view of a cargo bed management system according to the present teachings in a position that divides a bed of a motor vehicle.
Figure 3:
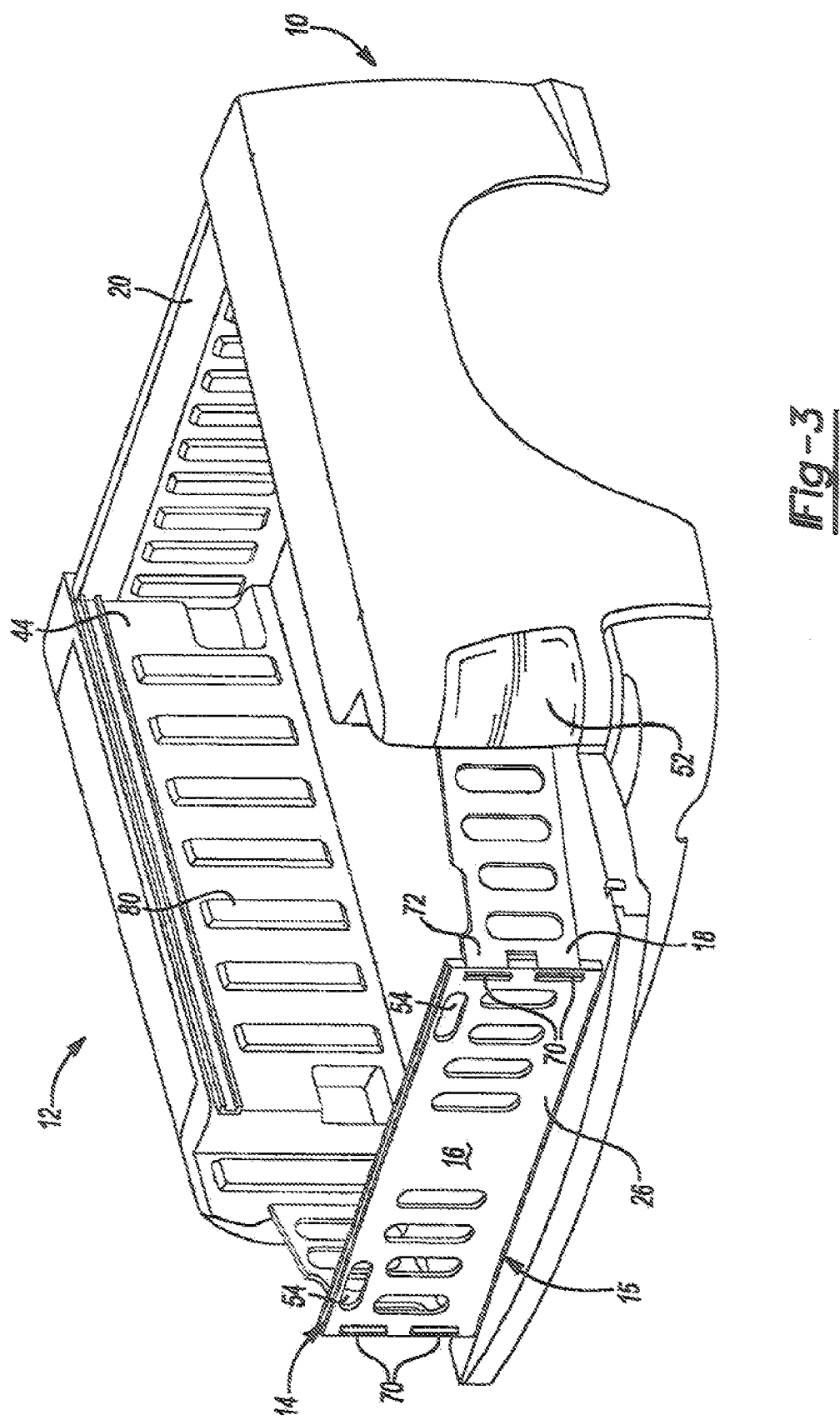
FIG. 3 is a perspective view of a cargo bed management system according to the present teachings in a position that extends a bed of a motor vehicle.

Referring to FIGS. 1-8, a motor vehicle 10 having a cargo bed 12 includes a cargo bed management system 14 according to the present teachings. The cargo bed management system 14 includes a main panel 16 having a pair of side panels 18 secured thereto. The cargo bed management system 14 may be converted from a stowable assembly 13 that may be stowed at the front 20 of the bed 12 of the vehicle 10 (FIG. 1) or used as a bed dividing system (FIG. 2), to an assembly 15 that may be used to extend the bed 12 of the motor vehicle 10 (FIG. 3). To extend the side panels 18 outward from the main panel 16 to an extended position that may be used to extend the bed of the motor vehicle.

As best shown in FIGS. 1 and 2, the cargo bed management system 14 as a stowable assembly 13 may be in a stowed position at the front 20 of the bed 12 of the motor vehicle 10 or a divided position where the bed 12 of the motor vehicle 10 may be divided into a pair of compartments 22. In the stowed and divided positions, the side panels 18 may be rotated at a hinge 24 toward a central portion 26 of the main panel 16.

Figure 4:
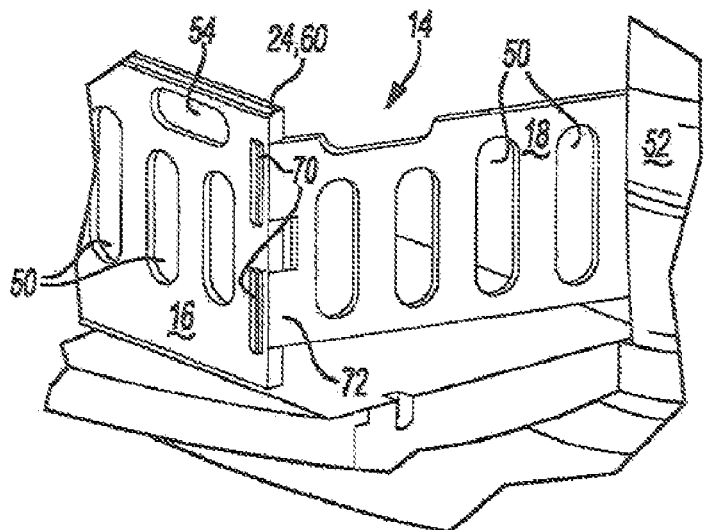
FIG. 4 illustrates a locking mechanism that secures a side panel to a principal panel of the cargo bed management system of the present teachings.
Figure 8:
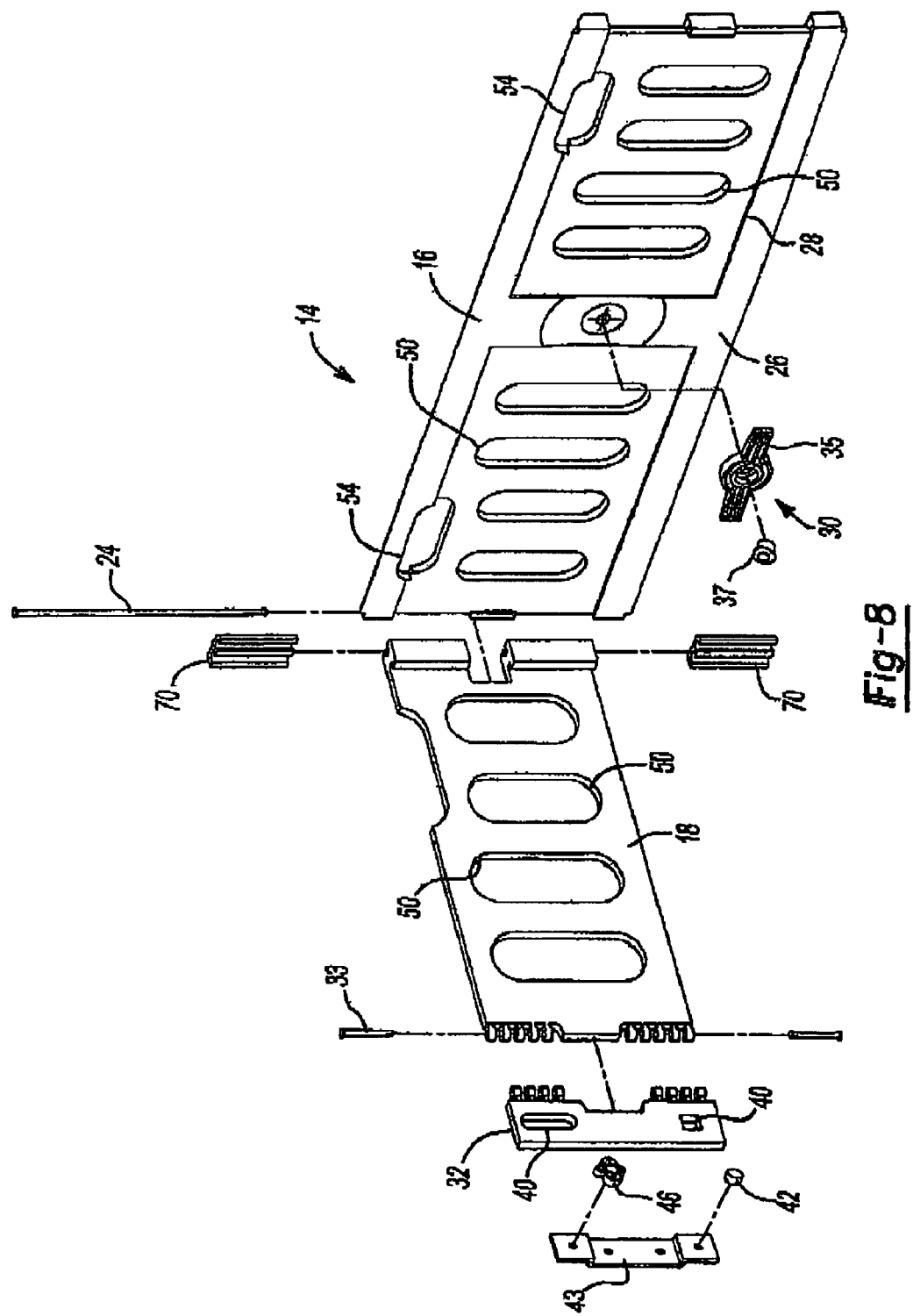
FIG. 8 is an exploded perspective view of a side panel and main panel of the cargo bed management system of the present teachings.

As shown in FIGS. 4 and 8, to accommodate the side panels 18 when the side panels 18 are rotated toward a central portion 26 of the main panel 16, the main panel 16 may be provided with a recessed portion 28 having the same shape and dimensions as each of the side panels 16. In this regard, the side panels 18 may have a width that is less than a width of the main panel 16 so that the side panels 18 may be accommodated within the main panel 16. It is contemplated, however, that the side panels 18 have a width that is equal to a width of the main panel 16.

Figure 5:
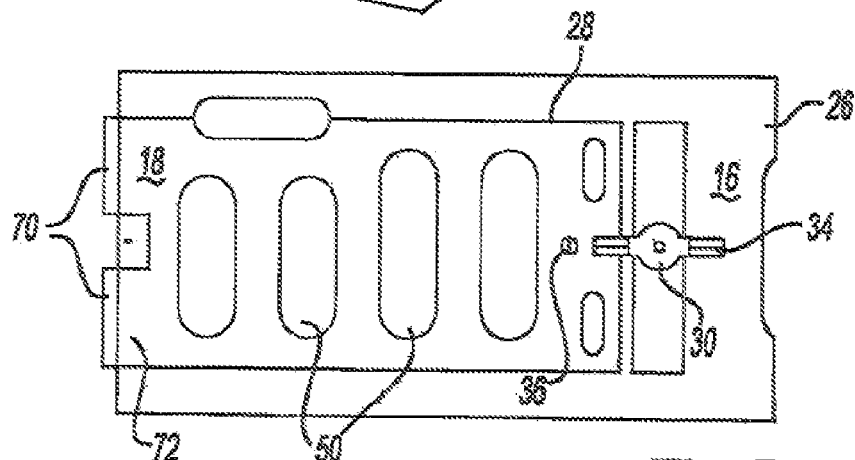
FIG. 5 illustrates a locking mechanism that secures a side panel of the cargo bed management system to a bed of a motor vehicle.
Figure 6:
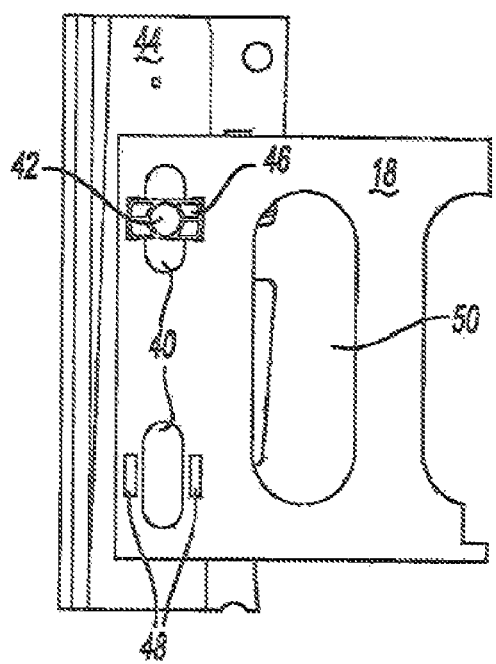
FIG. 6 is a perspective view of a joint between a principal panel and a side panel of the cargo bed management system according to the present teachings.
Figure 7:
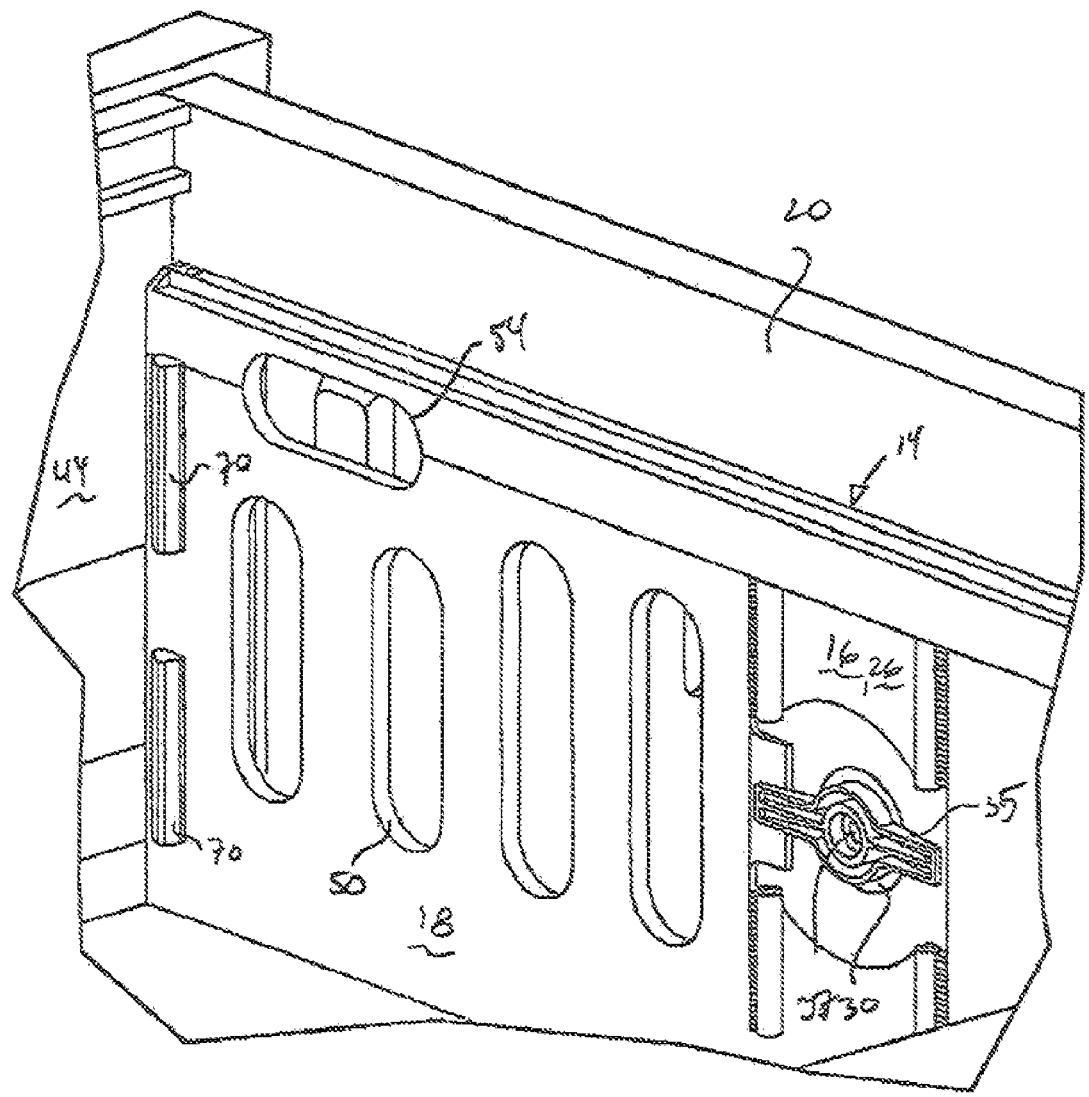
FIG. 7 is an enlarged, perspective view of the cargo bed management system in the stowed position.

To secure the side panels 18 to the main panel 16 when the side panels 18 are rotated toward the central portion 26 of the main panel 16 to a closed position, as shown in FIG. 5, the main panel 16 may be provided with a pair of locking mechanisms 30 that secure ends 32 of the side panels 18 to the main panel 16. The locking mechanism 30 may be, for example, a handle 34 that may be simply rotated by a quarter-turn to secure the side panels 18 to the main panel 16. Alternatively, the locking mechanism 30 may be a key cylinder 36 that permits the owner of the cargo management system 14 to lock the side panel 18 to the main panel 16. Another alternative is shown in FIGS. 7 and 8, where the locking mechanism 30 is a handle 35 including a key cylinder 37. Regardless, it should be understood that when the cargo bed management system 14 is to be an stowable assembly 13, the side panels 18 may be securely fastened to the main panel 16.

When the cargo bed management system 14 is in the extended position or open position illustrated in FIG. 3, the side panels 18 may be rotated outward from the main panel 16. Although the side panels 18 in their extended position relative to the main panel 16 are illustrated in FIG. 3 to be angled relative to the main panel 16, it should be understood that the side panels 18 may be rotated through a full 180° to be essentially co-planar with the main panel 16 without departing from the spirit and scope of the present teachings. To secure the cargo bed management system 14 to the bed 12 of the motor vehicle 10 when the side panels 18 are in an extended position relative to the main panel 16, ends 32 of the side panels 18 are provided with a pair of slots 40 that may be mated with a knob or protrusion 42 formed on a sidewall 44 of the bed 12 of the motor vehicle 10, or on a bracket 43 attached to sidewall 44 (see FIG. 8).

More particularly, referring to FIG. 5, the sidewalls 44 of the bed 12 of the motor vehicle 10 may be provided with at least one protrusion 42 or handle 46 that corresponds to a slot 40 formed in an end 32 of the side panels 18. When a handle 46 is used, the slot 40 may have a shape that corresponds to a shape of the handle 46 to allow the handle 46 to pass therethrough. Once the handle 46 has passed through the slot 40, the handle 46 may be rotated by a ¼ turn to secure the side panel 18 to the sidewall 44 of the bed 12. The side panel 18 may also be provided with a pair of burrows or recesses 48 that correspond to a pair of nubs (not shown) that may be formed on a surface of the handle 46 that faces the sidewall 44 of the bed 12. In this manner, the handle 46 is prevented from rotating during operation of the motor vehicle 10 and the cargo bed management system 14 may be reliably secured to the bed 12.

As best shown in FIGS. 3 and 8, when the cargo bed management system 14 is in the extended position 15, the side panels 18 are angled relative to the main panel 16 to enable the cargo bed management system 14 to be secured to the sidewall 44 of the bed 12. To properly align and secure the side panels 18 to the sidewall 44, ends 32 of the side panels 18 are hingedly connected to the side panels 18 by a hinge 33. Hingedly connecting ends 32 to side panel 18 enables the slots 40 to properly mate with protrusion 42 and handle 46. In this manner, cargo bed management system 14 may be properly secured to bed 12 of the vehicle 10.

The main panel 16 and side panels 18 of the cargo bed management system 14 may be formed of any material known to one skilled in the art. In this regard, preferable materials include a blow- or injection-molded plastic that is lightweight and able to withstand various changes in pressure and weight if the cargo in the bed 12 were to shift during operation of the motor vehicle 10. Other materials include metal such as steel, aluminum, magnesium, alloys thereof, polymeric materials, and thermoplastic materials. Regardless, as stated above, the material should be lightweight and have adequate strength to permit storage of various items within the bed 12 without damaging or destroying the panels 16 and 18 of the cargo bed management system 14.

The main panel 16 and side panels 18 are generally planar panels that may be formed to include a plurality of perforations 50 that enable other motorists to see the motor vehicles tail lamps 52. In this regard, the tail lamps 52 must be visible at up to a 45° angle relative to the motor vehicle 10, and 13% of the tail lamp 52 must be visible at all times. It should be understood, however, that solid panels 16 and 18 are also contemplated by the present teachings and are not out of the spirit and scope thereof.

To lift the cargo bed management system 14 from the stowed position and place th system 14 in either the divided position or extended position, the panels 16, 18 may be formed to have various handles 54 formed in the panels 16, 18. These handles are best shown in FIG. 5. Although the handles 54 in FIG. 5 are shown to be formed in the panels, handles 54 that are attached to the panels 16, 18 may also be used.

The side panels 18 may be attached to the main panel 16 through a connection assembly 60 such as a simple hinge 24 that permits the side panels 18 to rotate outward from the main panel. Alternatively, the side panels 18 may be secured to the main panel 16 by a connection assembly such as a drop-pin that permits rotational movement of the side panels 18, or a spring-loaded hinge that biases the side panels to the extended position relative to the main panel 16. Any assembly 60, however, that permits rotational movement of the side panel 18 relative to the main panel 16 may be used.

When the cargo bed management system 14 is in a stowed or divided position, the side panels 18 are rotated toward the central portion 26 of the main panel 16. When the side panels 18 are directed toward the main panel 16, at least one bumper 70 or compression device extends outward from the main panel 16. The compression devices 70 permit the stowable assembly 13 to be secured to the sidewalls 44 of the bed 12 of the motor vehicle 10 and are best shown in FIGS. 5, 7, and 8.

The compression devices 70 are affixed to ends 72 of the side panels 18 that are connected to the main panel 16. As shown in FIG. 5, the compression devices 70 extend outward relative to the main panel 16 when the side panels 18 are directed thereto. The compression devices 70 may extend outward in a length direction of the main panel 16 (i.e., to increase the length of the panel 16; see FIG. 5), or extend perpendicularly outward relative to the main panel 16 (i.e., to increase the width of the panel 16; see FIG. 7). The distance at which the compression devices 70 extend outward relative to the main panel 16 is dependent on a width of the bed 12 of the motor vehicle 10, or on a distance between ribs 80 that may be formed on the sidewall 44 of the bed 12.

More particularly, as best shown in FIGS. 1 and 2, the bed 12 of the motor vehicle 10 may be provided with a plurality of ribs 80 formed in the sidewalls 44. The ribs 80 may be spaced at a distance that is sufficient to accommodate a thickness of the stowable assembly 13. That is, the ribs 80 may be spaced at a distance that is wide enough to accommodate the cargo bed management system 14 when the side panels 18 are directed toward the main panel 16. When the stowable assembly 13 is disposed between a pair of ribs 80, the compression points 70 compress in a manner that wedges the assembly 13 between the ribs 80. In other words, the compression devices 70 provide a length and width dimension to the stowable assembly 13 that is either greater than a width of the bed 12 or a distance between adjacent ribs 80. Accordingly, due to the increased length or width dimension of the stowable assembly 13, the assembly 13 may be secured between sidewalls 44 of the bed 12, or between each of the ribs 80 in a manner that prevents movement of the system 14 in the stowed and divided positions.

Although the above configurations are described and illustrated relative to a cargo bed management system 14 that may traverse a width of the bed 12, it should be understood that the present teachings are equally applicable to a cargo bed management system 14 that may traverse a length of the bed 12. That is, the cargo bed management system 14 may be designed to divide or be stowed in a bed in a length direction of the bed 12. In this regard, lengths of the main and side panels 16 and 18 may be adjusted to accommodate a length dimension of the bed 12 as opposed to a width dimension of the bed 12 of the motor vehicle 10.

The compressor devices 70 may be formed of any compressible material that provides a compressible and non-skid surface to secure the cargo bed management system 14 to the bed 12 of the motor vehicle 10. Materials include, for example, compressible elastomers, polymers, and rubbers. Other alternative materials include foam-based materials.

The description of the present teachings is merely exemplary in nature and, thus, variations that do not depart from the gist of the present teachings are intended to be within the scope of the present teachings. Such variations are not to be regarded as a departure from the spirit and scope of the present teachings.

What is claimed is:

1. A removable extension system for a bed of a motor vehicle, comprising:
    a main panel; and
    a pair of side panels rotatably coupled to said main panel between an open position and a closed position, said side panels extending outward from said main panel in said open position and toward said main panel in said closed position, each of said side panels including at least one compressible member at an end thereof,
    wherein when said side panels are in said closed position, said compressible members extend outward from edges of said main panel to secure the extension system to the bed of the motor vehicle.

2. The removable extension system of claim 1, wherein said compressible members are formed of a compressible material.

3. The removable extension system of claim 2, wherein said compressible material is a rubber- or polymeric-based material.

4. The removable extension system of claim 1, wherein said compressible members are spring-loaded.

5. The removable extension system of claim 1, wherein said main panel and said side panels are formed of a thermoplastic material.

6. The removable extension system of claim 1, wherein said side panels, in said open position, are connectable to the bed.

7. A cargo bed management system for dividing or extending a bed of a motor vehicle, comprising:
    a main panel having a length approximately equal to a width of the bed;
    a pair of side panels hingedly connected to said main panel so that said side panels may rotate relative to said main panel from a stowed position where said side panels are directed toward said main panel to an extended position where said side panels extend outward from said main panel; and
    at least one bumper affixed to an end of each of said side panels that is hingedly connected to said main panel such that said bumper increases a length of said main panel when said side panels are in said stowed position,
    wherein when said main panel and said side panels are in said stowed position and disposed across said width of the bed, said bumpers compress to secure said main panel and said side panels to the bed.

8. The cargo bed management system of claim 7, wherein said bumpers are formed of a compressible material.

9. The cargo bed management system of claim 8, wherein said compressible material is selected from the group consisting of elastomers, polymers, and rubbers.

10. The cargo bed management system of claim 7, wherein said bumpers provide a non-skid surface between said panels and the bed.

11. The cargo bed management system of claim 7, wherein said main panel and said side panels include a plurality of perforations.

12. The cargo bed management system of claim 7, wherein when said side panels are in said extended position relative to said main panel, said side panels are connectable to the bed.

13. The cargo bed management system of claim 12, wherein said side panels include at least one slot that mates with a protrusion or handle formed on the bed.

14. The cargo bed management system of claim 7, wherein said main panel includes a locking mechanism that secures said side panels to said main panel when said side panels are in said stowed position.

15. The cargo bed management system of claim 14, wherein said locking mechanism is a handle or a key cylinder.

16. A cargo bed management system that may be disposed to traverse a width of a bed of a motor vehicle or disposed to extend a length of the bed, the bed including sidewalls that include a plurality of ribs, the cargo bed management system comprising:
    a main panel having a length approximately equal to the width of the bed and a width approximately equal to a distance between the ribs;
    a pair of side panels rotatably coupled to the main panel such that said side panels may rotate toward a central portion of said main panel to form a stowable assembly and rotate outward away from said central portion to form an extended assembly; and
    a plurality of bumpers attached to said side panels, said bumpers compressing upon disposition of said stowable assembly across the width of the bed between the sidewalls of the bed or between the ribs of the sidewalls to secure said stowable assembly to the bed.

17. The cargo bed management system of claim 16, wherein said bumpers provide a non-skid surface between said panels and the bed.

18. The cargo bed management system of claim 16, wherein said main panel includes a locking mechanism that secures said side panels to said main panel to form said integral assembly.

19. The cargo bed management system of claim 18, wherein said locking mechanism is a handle or a key cylinder.

20. The cargo bed management system of claim 16, wherein said main panel includes recesses having dimensions substantially equal to dimensions of said side panels for accommodating said side panels in said stowable assembly.

* * * * *